Dec. 8, 1931.  B. P. JOYCE  1,835,877
PACKING
Filed Sept. 20, 1928  3 Sheets-Sheet 1

INVENTOR
Bryan P. Joyce

Dec. 8, 1931.  B. P. JOYCE  1,835,877
PACKING
Filed Sept. 20, 1928  3 Sheets-Sheet 2

INVENTOR
Bryan P. Joyce

Dec. 8, 1931.    B. P. JOYCE    1,835,877
PACKING
Filed Sept. 20, 1928    3 Sheets-Sheet 3

INVENTOR
Bryan P. Joyce

Patented Dec. 8, 1931

1,835,877

UNITED STATES PATENT OFFICE

BRYAN P. JOYCE, OF DAVENPORT, IOWA

PACKING

Application filed September 20, 1928. Serial No. 307,151.

My invention has reference in general, to packings, and more particularly it relates to a packing for use with movable members.

The principal object of my invention is to provide a simple, compact and effective packing for movable parts. Among the further objects of my invention are to provide a packing, devoid of rubber, leather and similar packing materials which might be injured by the lubricant or the fluids in the machine or which might injure parts of the machine; to provide a protective packing for bearings in pumps, compressors and other machines containing a fluid injurious to the bearings; to provide a packing embodying a fluid seal, the packing fluid being adapted to lubricate the bearing; to provide a packing embodying a fluid seal and enclosing a bearing within the seal, the pressure of the packing fluid preventing binding of the part cooperating with the bearing; to provide a packing embodying a fluid seal and novel means for maintaining pressure fluid within the seal; to provide novel means for maintaining the packing and the packed parts in assembled relation; and such further objects, advantages and capabilities as will hereafter appear and as are inherent in the construction disclosed herein. My invention further resides in the combination, construction and arrangement of parts illustrated in the accompanying drawings, and, while I have disclosed therein what is now considered the preferred forms of this invention, I desire it understood that the present disclosure is to be considered as illustrative only and not as limiting my invention.

Figure 1:
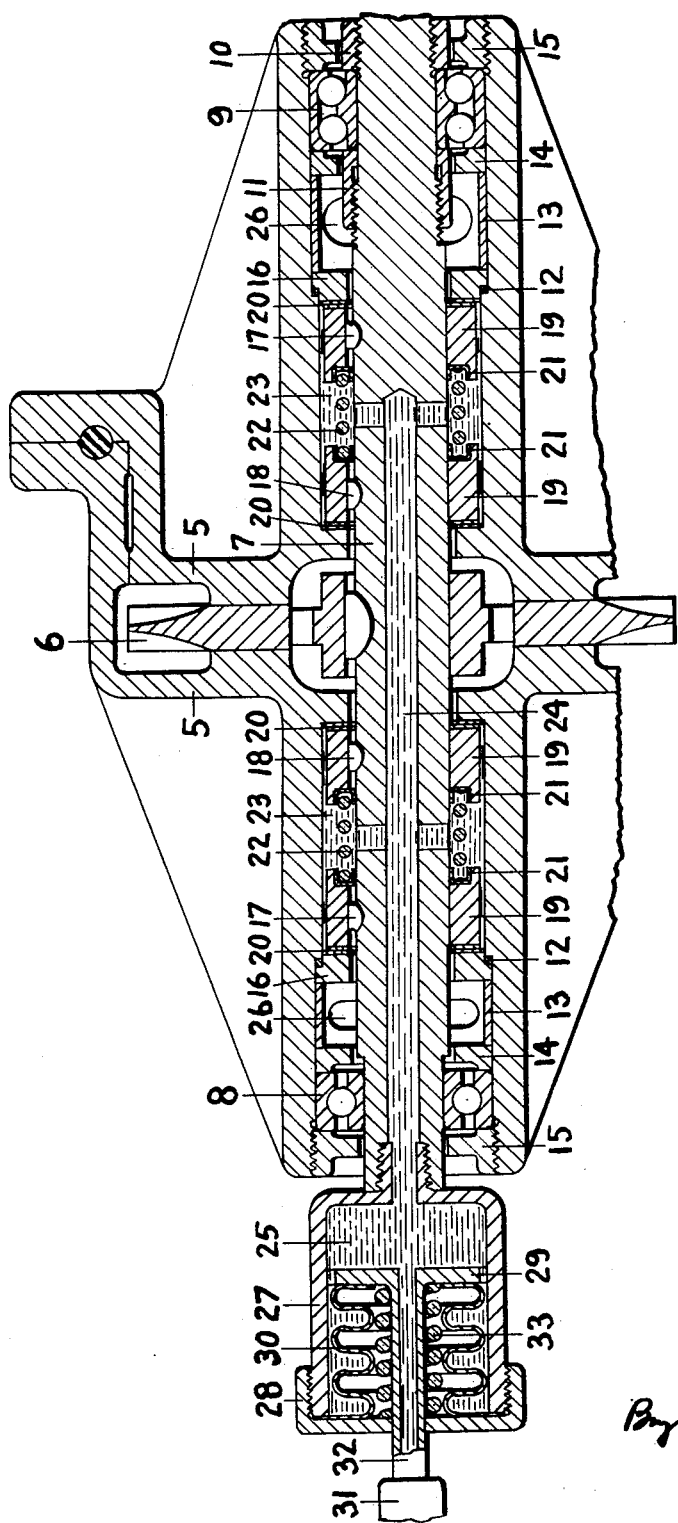
Figure 2:
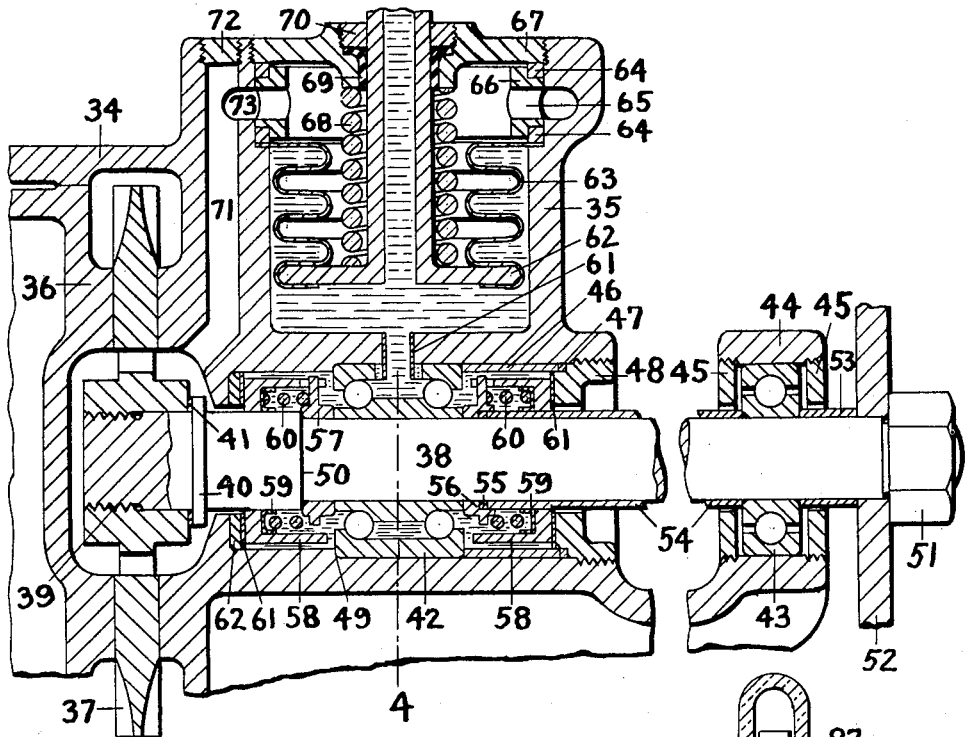
Figure 3:
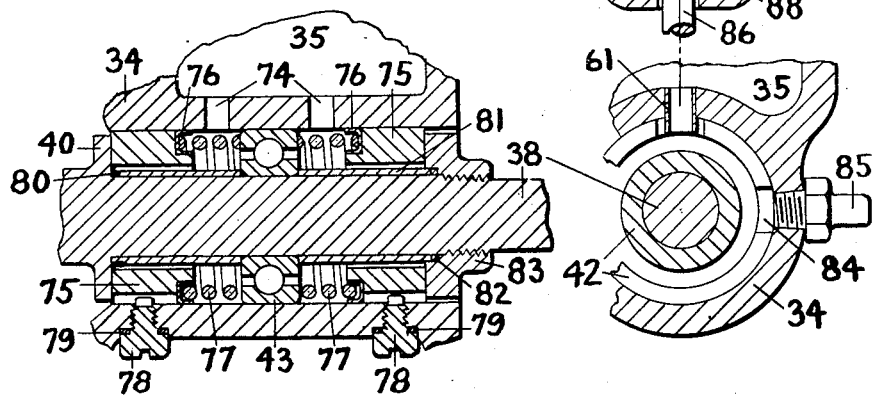
Figure 4:
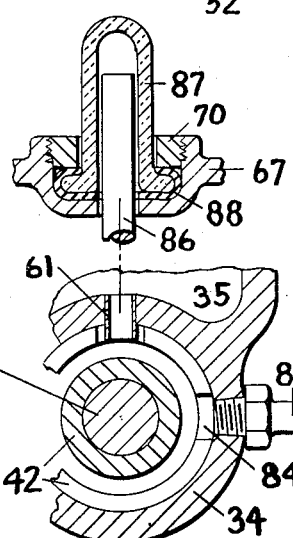
Figure 5:
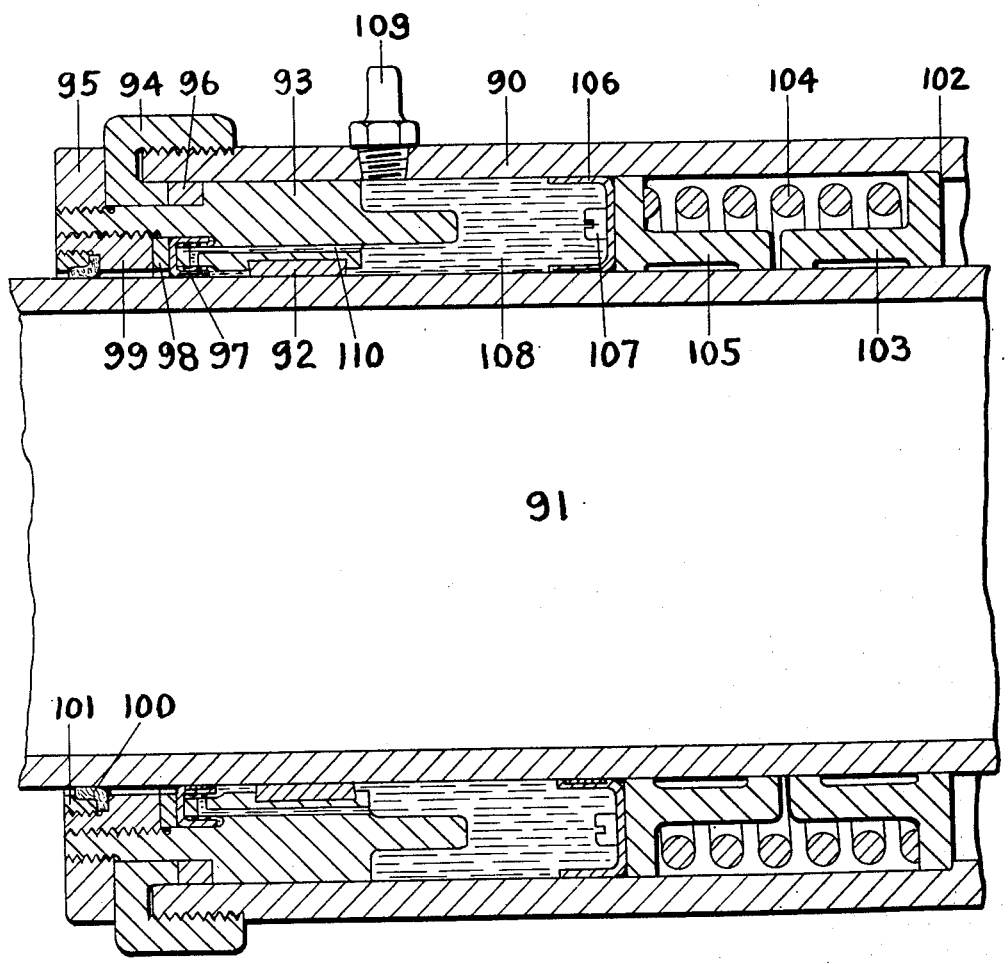

In the drawings annexed hereto and forming a part hereof, Fig. 1 shows a longitudinal section through a rotary pump having a bearing upon each side of the impeller; Fig. 2 shows a longitudinal section through a rotary pump having bearings upon but one side of the impeller; Fig. 3 shows a modification of the packing of Fig. 2; Fig. 4 depicts fragmentary sections on the line 4 of Fig. 2 showing modification of certain parts; Fig. 5 is a longitudinal section showing the packing of a counterpoise.

Referring more in detail to the annexed drawings, 5 designates the pump casing in which the impeller 6 is mounted on its shaft 7. The shaft 7 extends to the right in order that the impeller may be driven and is mounted in the casing by the bearings 8 and 9. The outer races of these bearings are fixed by the threaded rings 15 clamping them against the parts 14, 13 and 16 and the packing 12. The inner race of the bearing 8 is slidable upon the shaft 7. The inner race of the bearing 9 is clamped to the shaft by means of the threaded rings 10 and 11; therefore this bearing positions the shaft longitudinally as well as radially. Keys 17 and 18 are fixed in the shaft 7 and project into keyways in the packing rings 19 as shown, the keys 17 having notches in their outer ends to aid in disassembly. At 20 are shown facings of chromium or similar hard metal upon the rings 19, 16 and the casing 5. The packing rings 21 of U section, and made of brass or other metal, seal the joints between the shaft and the packing rings 19. The helical springs 22 maintain the packing rings 19 and 21 in position as they are of sufficient strength to overcome the friction between the rings and the shaft 7. The chambers 23 are maintained full of fluid under pressure through the passages 24 in the shaft 7, by means of the pressure device 25. This fluid is conveniently grease or other lubricant and its pressure is at all times greater than the pressure of the pumped fluid adjacent the packing; therefore the fluid pumped cannot enter the chambers 23. The device 25 is threaded into the shaft 7 as shown, the direction of the threads being such that the inertia of the device against rotation will tend to tighten the joint. When in movement, in packings of this nature, the grease filler in the form of soapy chips is very slowly extruded from the packing. The ports 26 are provided both in the parts 13 and the casing 5 in order that worn out grease will not enter the bearings 8 and 9, also to permit adjustment of the ring 11. The threads of the rings 10 and 11 are of opposite hands, and are of such direction that their inertia against rotation and the inertia of the race as well as the frictional action of the bearing, tend to increase the grip of the rings upon the inner bearing race. The impeller 6 is fixed to the shaft 7 and both the packing and the rings 10 and 11 are constructed to permit adjustment of the impeller to the case 5. The clearance between the impeller and case is very small and as in operation the temperature of the shaft is greater than the temperature of the case (due to unequal radiation) it is desirable that the bearing controlling such clearance be as near the impeller as possible, otherwise unequal expansion between shaft and case is likely to bind the impeller against the case. In the present disclosure, it may be seen that if the impeller clearance was controlled by both bearings the danger of such binding would be doubled, therefore the control of such clearance by the one bearing, as shown, is preferred. Both of the annular sealing friction surfaces shown at 20, may be highly polished and of very hard metal such as chromium, also in some instances it is desirable to have but one surface of hard metal and the other of softer metal.

The fluid pressure device 25 includes the casing 27 having a cap 28 and in which the piston 29 is mounted. The corrugated cylinder 30 is fluid tightly secured at one end to the case 27 by the cap 28, and its other end is secured to the piston 29 by solder or other means, as shown. Fluid is introduced into the device through the valve 31 and the hollow piston stem 32 and is maintained under pressure by the spring 33 acting between the cap 28 and the head of the piston 29. The cylinder 30 is made of thin flexible metal such as copper or brass, or it may be made of resilient metal such as spring steel or spring brass in which case the spring 33 is omitted. This device is for use with machines having comparatively low pressures at the packing, say about 50 pounds per sq. inch, in which case the spring 33 or the cylinder 30 would be of such strength as to maintain the packing fluid under a pressure of 60 to 65 pounds per sq. inch. The advantage of the present device over a packed plunger is that packing friction is eliminated with the result that the packing fluid pressure can be maintained at a minimum, whereas with a packed plunger such pressure is half the time the required minimum plus twice the plunger friction. As the pressure device is attached to the rotor, centrifugal force aids in maintaining the chambers 23 full of fluid. The amount the piston stem 32 projects from the cap 28 indicates the reserve of packing fluid; this is important both to prevent undue compression of the cylinder 30 and to indicate that the chambers 23 are full of pressure fluid. Sometimes it is desired to operate two or more pumps in series in which case the device 25 is assembled in a tapped hole on the case 5 into one of the chambers 23, the end of the shaft 7 being plugged and left free to receive a second pump.

In Fig. 2, 34 designates the casing which includes the pressure device 35 and which has a bracket 44. the casing being closed by the cap 36. The impeller 37 on its shaft 38 is mounted within the casing and bracket by means of the bearings 42 and 43. The outer race of the bearing 43 is slidable in the bracket 44 and enclosed by the threaded rings 45. The threaded ring 48 clamps the outer race of the bearing 42 against the casing shoulder 49 by means of the packing 47 and the sleeve 46. Parts 52, 53, the inner race of bearing 43, 54, 55, 56, the inner race of bearing 42, and 57 are clamped to shaft 38 and against its shoulder 50 by means of nut 51. It is seen that the bearing 42 positions the rotor longitudinally as well as radially. The impeller is threaded upon the shaft as at 39, the direction of the threads being such that the inertia of the impeller against rotation and the resistance of the pumped fluid tightens the impeller against the shim 41 and the shoulder 40, the thickness of the shim 41 positioning the impeller within the casing. A ring of metal 62, carrying a facing 61 of tin or lead amalgam is fixed in the casing 34; the ring 48 also carries a similar facing 61. The packing rings 58 have annular sealing friction surfaces of hard polished metal to contact the amalgam 61 and the thin metal rings 59 of U section seal the joints between the packing rings, the shaft 38 and the sleeve 54. The helical springs 60 maintain the rings 58 and 59 in position, these springs being strong enough to overcome the friction of the rings with the rotor. Projections from the rings 56 and 57 engage the packing rings 58, as shown, and prevent rotary movement between the packing rings and the rotor. Pressure fluid from the device 35 enters the chamber formed about the bearing 42, through the tube 61. The outer race of the bearing 42 is split and contains a hole into which the tube 61 projects, as shown, the tube being fixed in the casing. The threaded cap 67 clamps the packings 64, the ring 66 and one end of the corrugated tube 63 in place as shown, the other end of the tube being fixed to the piston head 62. The stem of the piston 62 is packed by the packing 69 and gland 70. The spring 68, acting between the cap 67 and the piston 62, maintains the packing fluid under pressure; the pumped fluid enters the interior of the cylinder 63 through the passages 71, 73 and 65 to increase such pressure. This device is for use with machines having higher pressures than the one shown in Fig. 1, the spring 68 being of such strength as to boost the pressure of the packing fluid above that of the pumped fluid, the friction of the packing 69 and the area of the piston stem of course being considered. The remarks made about the device 25 of Fig. 1 apply to this device as concerns filling, indication, pressure means, etc. It is apparent that the construction shown in Fig. 2 is much simpler than that of Fig. 1. This is brought about by placing the bearing 42 in the grease of the packing; at high speeds this causes certain heating as the bearing churns the grease, the heat of course being absorbed by the fluid pumped; therefore the operating speed must be considered in selecting the construction to be used. The pressure device of Fig. 2 may of course be used with the construction of Fig. 1, a plug being assembled in the shaft instead of the device 25. Also this device 25 may be used with the construction of the present figure.

Fig. 3 shows a modification of the packing of Fig. 2 adapted to function in connection with longitudinal adjusting means similar to that shown with bearing 9 in Fig. 1. The ring 83 threaded on the shaft 38 grips the packing 82, the sleeve 81, the inner race of the bearing 43 and the sleeve 80 against the shoulder 40, the outer race of the bearing 43 being slidably mounted in the casing 34, the threads of the ring 83 having such direction that both its inertia against rotation and the friction of the part cooperating therewith increases its grip upon the parts. The annular sealing friction surfaces of the packing rings 75 contact the shoulder 40 and the part 83. The rings 75 are prevented from rotating by the screws 78 which project into keyways in the rings as shown, the screws being sealed by the gaskets 79. The rings 76 of U section seal the joints between the rings 75 and the casing 34 while the helical springs 77 hold the rings in position as they are of sufficient strength to overcome any friction between the rings and the casing. The passages 74 admit packing fluid from the pressure device 35 to the chamber about the bearing 43, this fluid being under proper pressure maintains both the rings 75 and the rings 76 in sealing contact.

Fig. 4 shows fragmentary sections on the line 4 of Fig. 2 to illustrate certain modifications of the pressure device. The numeral 84 designates a port in the outer race of the bearing 42 opposite the valve 85 through which packing fluid may be introduced into the chamber about the bearing and through the tube 61 into the pressure device 35. A transparent cap 87 is positioned in the cap 67 by means of the packing 88 and the gland 70, to receive the solid stem 86 of the piston 62. This modification is for use with high pressure machines, the advantages of it over the device of Fig. 2 being, that the pumped fluid exerts pressure over the entire area of the piston, also the friction of the piston stem packing 69 is eliminated, leaving, but the required difference in pressure between the packing fluid and the fluid pumped to be taken care of by the spring 68, the reserve of packing fluid being registered by the position of the stem 86 within the transparent cap 87.

In Fig. 5 is shown the packing of a counterpoise including a bearing, such a counterpoise being covered by my Patent 1,460,419, July 3, 1923. The numeral 90 designates the casing in which the hollow plunger 91 is mounted, the plunger being supported by the anti-friction metal bearing 92 which is fixed in the head 93, the head being secured to the casing by the threaded ring 94, the head ring 95 and the packing 96. A packing ring 97 is secured to the head by the follower 98 and the threaded ring 99, the wiper 100 being carried by the ring 99 and secured therein by the wiper ring 101. The casing shoulder 102 seats the ring 103 which in turn seats the helical spring 104 which actuates the ring 105 carrying the packing ring 106 secured thereto by the screws 107. The grease chamber 108 is filled through the valve 109 and the ports 110 in the head admit grease within the ring 97. The gas within the plunger and casing cooperates with the spring 104 to maintain the grease under greater pressure than the gas; therefore there can be no escape of gas. In Patent 1,460,419 the bearing D9 was without the grease chamber; in the present invention the bearing 92 is included in the grease chamber. Therefore the bearing of the present invention is better lubricated, also the clearance between the bearing and plunger is maintained constant. In the prior patent the pressure within the hollow plunger enlarged its tending to make it bind in its bearing D9; in the present invention the pressures within and without plunger 91 at the bearing 92 are nearly balanced; therefore there is no chance of such binding.

It is of course understood that specific description of structure set forth herein may be departed from without departing from the spirit of my invention as set forth herein and expressed in the appended claims.

Having now described my invention, I claim:

1. A packing between relatively movable parts of a machine, said machine containing fluid, said packing comprising a chamber between said parts and full of fluid other than the machine fluid, said chamber being closed at each of its ends by two metal packing rings, the first ring having an annular sealing friction surface to contact the part cooperating therewith, means engaging the first ring and one of the machine parts to prevent rotary movement between them, the second ring sealing the joint between the machine part and the first ring, means acting on the second ring and holding both rings in position and means adapted to keep the packing chamber full of fluid and to maintain said fluid under pressure.

2. A packing between relatively movable parts of a pressure fluid machine, said packing comprising a chamber between said parts and full of fluid other than the machine fluid, said chamber being closed at each of its ends by two metal packing rings, the first ring having an annular sealing friction surface to contact the part cooperating therewith, means engaging the first ring and one of the machine parts to prevent rotary movement between them, the second ring sealing the joint between the machine part and the first ring; resilient means acting on the second ring and holding both rings in position and means integral with one of the machine parts adapted to keep the packing chamber full of fluid and to maintain said fluid under greater pressure than the machine fluid adjacent the packing.

3. A packing between relatively movable parts of a pressure fluid machine, said packing member comprising a chamber between said parts and full of fluid, said chamber being closed by metal packing rings, a bearing mounted within the chamber, the chamber fluid having lubricating qualities and lubricating the bearing, and resilient means cooperating with the machine fluid and adapted to maintain the packing fluid under greater pressure than the machine fluid, to prevent entry of the machine fluid into the packing chamber.

4. The combination with a bearing mounted between relatively movable parts of a pressure fluid machine, of two metal packing rings mounted upon each side of the bearing and between said parts, forming a chamber about the bearing, said chamber being full of fluid, the first ring having a solid, annular sealing friction surface contacting the part cooperating therewith, means engaging the first ring and one of the machine parts adapted to prevent rotary movement between them but permitting longitudinal movement, the second ring made of thin flexible metal and of U section being seated withing the first ring and sealing the joint between the machine part and the first ring, resilient means holding both rings in position, pressure means integral with one of the machine parts adapted to keep the packing chamber full of fluid and to maintain said fluid under greater pressure than the machine fluid adjacent the packing; and said packing fluid maintaining sealing pressure between the packing rings and the parts with which they cooperate to prevent entry of the machine fluid into the packing chamber.

5. In a machine, a casing, a rotor within the casing, said rotor being positioned within the casing by means of a plurality of bearings, one of the bearings positioning the rotor longitudinally as well as radially, a packing between the casing and rotor, said packing comprising a chamber between the casing and rotor and full of fluid, said chamber being closed at each of its ends by two metal packing rings, the first ring having an annular sealing friction surface contacting the part cooperating therewith, means engaging the first ring and one of the machine parts to prevent rotary movement between them, the second ring being seated within the first ring and sealing the joint between the machine part and the first ring, resilient means holding both rings in position, a pressure device for fluids integral with one of the machine parts and in open communication with the packing chamber, said device containing fluid and including a flexible cylinder and a piston adapted to feed said fluid to the packing chamber and to maintain the fluid under pressure, said fluid maintaining the packing rings in sealing contact with the parts with which they cooperate, means permitting replenishment of the packing fluid and means indicating the amount of packing fluid.

6. In a pressure fluid machine, a casing, a rotor within the casing, said rotor being positioned within the casing by means of bearings, a packing between the casing and rotor and forming a chamber about one of the bearings, said chamber being full of fluid and closed at each of its ends by two metal packing rings, the first ring having an annular sealing friction surface contacting the part cooperating therewith, means engaging the first ring and one of the machine parts to prevent rotary movement between them, the second ring being seated within the first ring and sealing the joint between the machine part and the first ring, means holding both rings in position, a pressure device integral with one of the machine parts and adapted to keep the packing chamber full of fluid and to maintain the packing fluid under greater pressure than the machine fluid adjacent the packing, to prevent entry of machine fluid into the packing chamber.

7. A packing between relatively movable parts of a machine, said machine containing fluid said packing comprising a chamber between said parts and full of fluid other than the machine fluid, said chamber being closed at each of its ends by two metal packing rings, the first ring having an annular sealing friction surface contacting the part cooperating therewith, means engaging the first ring and one of the machine parts to prevent rotary movement between them, the second ring, made of thin flexible metal and of U section, being seated within the first ring, said second ring sealing the joint between the machine part and the first ring, means pressing the second ring against its seat within the first ring and maintaining both rings in position, and pressure means integral with one of the machine parts adapted to keep the packing chamber full of fluid and to maintain said fluid under pressure.

8. A packing between relatively movable parts of a pressure fluid machine said packing comprising a chamber between said parts and full of fluid other than the machine fluid, said chamber being closed at each of its ends by two metal packing rings, the first ring having an annular sealing friction surface contacting the part cooperating therewith, means engaging the first ring and one of the machine parts to prevent rotary movement between them, the second ring, made of thin flexible metal and of U section, being seated within the first ring, said second ring sealing the joint between the machine part and the first ring, means pressing the second ring against its seat within the first ring and maintaining both rings in position, and pressure means integral with one of the machine parts adapted to keep the packing chamber full of fluid and to maintain said fluid under greater pressure than the machine fluid.

9. A packing between relatively movable parts of a pressure fluid machine, said packing comprising metal packing rings mounted between said parts forming a chamber between them, said chamber being full of fluid, a bearing mounted between said parts and within said chamber, the chamber fluid having lubricating qualities and lubricating the bearing and means cooperating with the machine fluid and adapted to keep the packing chamber full of fluid and to maintain said fluid under greater pressure than the machine fluid adjacent the packing.

10. In a machine, said machine including a casing containing fluid under pressure; the combination of a packing, a bearing and a fluid pressure device, said packing comprising packing rings mounted between relatively movable parts of the machine and forming a chamber between them, said chamber being full of packing fluid, said bearing being mounted between the machine parts and within said chamber, said packing fluid having lubricating qualities and lubricating the bearing, said fluid pressure device being integral with one of the machine parts and in communication with the packing chamber and said device containing packing fluid and being adapted to keep the packing chamber full of fluid and maintain said fluid under greater pressure than the machine fluid adjacent the packing.

In witness whereof, I hereunto subscribe my name to this specification.

BRYAN P. JOYCE.